United States Patent [19]

Kawakami

[11] Patent Number: 4,931,987
[45] Date of Patent: Jun. 5, 1990

[54] WORD PROCESSOR FOR LOCATING BEGINNING POSITION OF TEXT ELEMENT AND DISPLAYING CORRESPONDING FORMATTING DATA AND FORMATTING MARK SEPARATELY

[75] Inventor: Yasushi Kawakami, Nagoya, Japan

[73] Assignee: Brother Kogyo Kabushiki Kaisha, Nagoya, Japan

[21] Appl. No.: 134,031

[22] Filed: Dec. 17, 1987

[30] Foreign Application Priority Data

Dec. 18, 1986 [JP] Japan .................. 61-302597

[51] Int. Cl.$^5$ .............................. G06F 3/153
[52] U.S. Cl. .................. 364/900; 364/943.43; 364/947.5; 364/927.62; 364/927.66; 364/521; 340/724; 400/76
[58] Field of Search ... 364/200 MS File, 900 MS File, 364/518, 521, 419; 340/724; 400/63, 76, 83

[56] References Cited

U.S. PATENT DOCUMENTS

| | | | |
|---|---|---|---|
| 3,872,460 | 3/1975 | Fredrickson et al. | 340/789 X |
| 4,056,821 | 11/1977 | Vittorelli | 364/900 |
| 4,125,868 | 11/1978 | Hruby et al. | 364/900 |
| 4,160,981 | 7/1979 | Raney, Jr. | 340/721 |
| 4,506,343 | 3/1985 | Shipp, Jr. et al. | 364/900 |
| 4,686,649 | 8/1987 | Rush et al. | 364/200 |
| 4,736,308 | 4/1988 | Heckel | 364/518 |

FOREIGN PATENT DOCUMENTS

WO86/05294 9/1986 PCT Int'l Appl.
1318490 5/1973 United Kingdom.

Primary Examiner—Thomas C. Lee
Attorney, Agent, or Firm—Dennison, Meserole, Pollack & Scheiner

[57] ABSTRACT

In the operation of creating a text by depressing the keys on the keyboard, when a format code search key is depressed by an operator at an erroneous position, the cursor is moved by the operator to a position where an appropriate format code mark is indicated; and the specific key such as an upward moving cursor key or a downward moving cursor key is depressed to vertically scroll the picture on the display and sequentially move the cursor to a position where another format code mark is indicated. Thus, the cursor can be easily moved to an intended format code mark.

4 Claims, 6 Drawing Sheets

FUNCTION KEYS   CHARACTER KEYS

WORD PROCESSOR FOR LOCATING BEGINNING POSITION OF TEXT ELEMENT AND DISPLAYING CORRESPONDING FORMATTING DATA AND FORMATTING MARK SEPARATELY

BACKGROUND OF THE INVENTION

The present invention relates to an improved word processor, and more particularly to a word processor having the various functions as will be described.

Some types of word processors are capable of changing a format code during inputting of a certain text. The format code means information relating to formatting of the number of characters to be inputted in one line, each position of a left and right margin, positions of tabulation, a character pitch and the like.

Once a desired format code is set, the text inputted is formatted by the format code until the next format code is reset. Further, in editing the text inputted, the text is divided at positions where desired format code is set, and each divided text section is formatted by each format code.

In one kind of such a word processor, the information relating to the format code is not displayed on a display. However, this type of word processor is inconvenient to use when the format code is intended to be changed during editing of the text.

In another type of word processor, the information relating to the format code is indicated at a cursor position where the format code is set. That is, the format code is indicated in the text area. However, this type of word processor is troublesome when an operator intends to find the format code. Further, as the format code is not printed, the indicated condition of characters on the display does not accord with the printout condition of the characters.

In changing the format code, the format code is reset after the cursor is moved to a position of the format code to be changed. However, the operator does not always remember the position of the format code. Especially, in the case that the text is too long, and the full text cannot be displayed on the display at a stroke, the operator experiences difficulty in finding the format code.

SUMMARY OF THE INVENTION

Accordingly, it is an object of the present invention to provide a word processor which enables an operator to easily find a format code.

It is another object of the present invention to provide a word processor which enables the operator to efficiently change the format code.

According to the present invention, the display is divided into a format code display area and a text display area. In a text creating mode, a cursor is normally moved from a left margin to a right margin on the text display area at the same time when characters are inputted, and when the cursor reaches the right margin or a return key is depressed, the cursor is moved to the next line. In changing a format of the text to be subsequently inputted, a format setting key is depressed to select a format setting mode. At this time, the cursor is moved to the format code display area separated from the text display area. Then, the format code setting key is depressed to reset a new format code. After resetting the format code, a text creating mode selecting key is depressed to select the text creating mode again. At the same time, the cursor is moved to a head position in a text area to be formatted by the reset format code.

In editing a text having been inputted, the format code can be changed according to the present invention. First, the cursor is moved to a text area intended to be changed in format, and then the format setting key is depressed. As a result, the cursor is moved to a position where the format code is indicated in the format display area. If the format code is not indicated on the display, the display is vertically scrolled to make the format code appear on the display. Then, the format setting key is depressed to reset a new format code. After resetting the new format code, the text creating mode selecting key is depressed to select a text editing mode. Thus, the text area to be edited is reformatted by the reset format code, and is displayed on the display.

The invention will be more fully understood from the following detailed description and appended claims when taken with the drawings.

DETAILED DESCRIPTION OF THE PREFERRED EMBODIMENT

Figure 1:
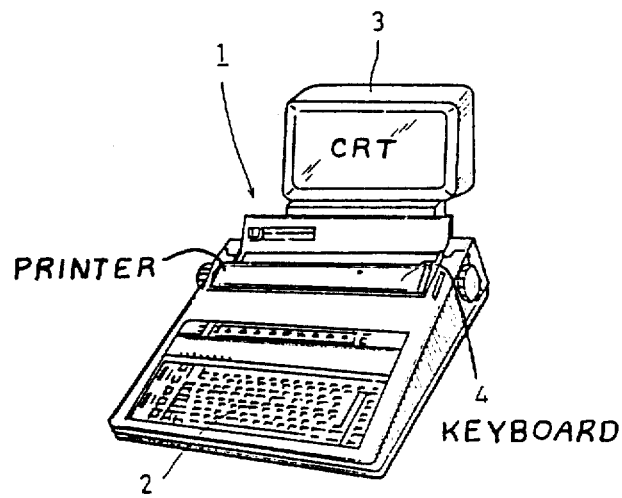
FIG. 1 is a perspective view of the word processor of a preferred embodiment according to the present invention.

Referring now to FIG. 1 which shows a perspective view of a word processor 1. The word processor 1 includes a keyboard 2 to be operated for setting various modes and inputting various characters, a display 3 having a CRT for suitably displaying characters, symbols and the like inputted by the keyboard 2 and stored in a memory of the word processor 1, and a printer 4 for printing out the characters and the like stored in the memory of the word processor 1.

Figure 2:
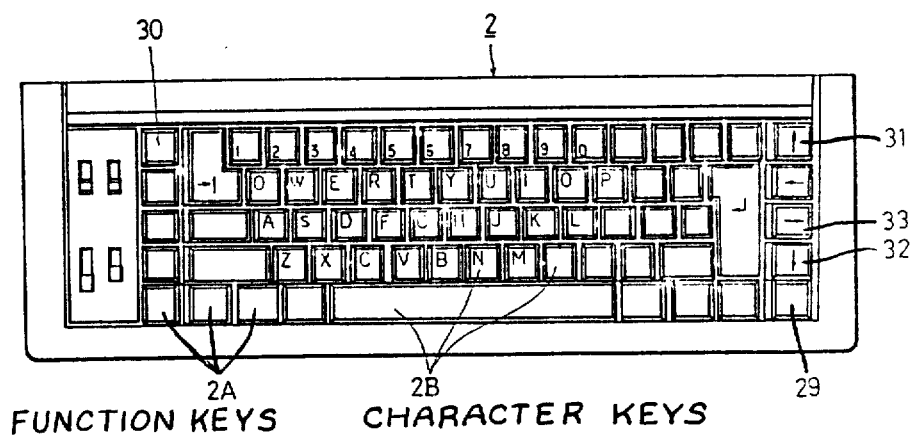
FIG. 2 is a plan view of the keyboard of the word processor shown in FIG. 1.
Figure 3:
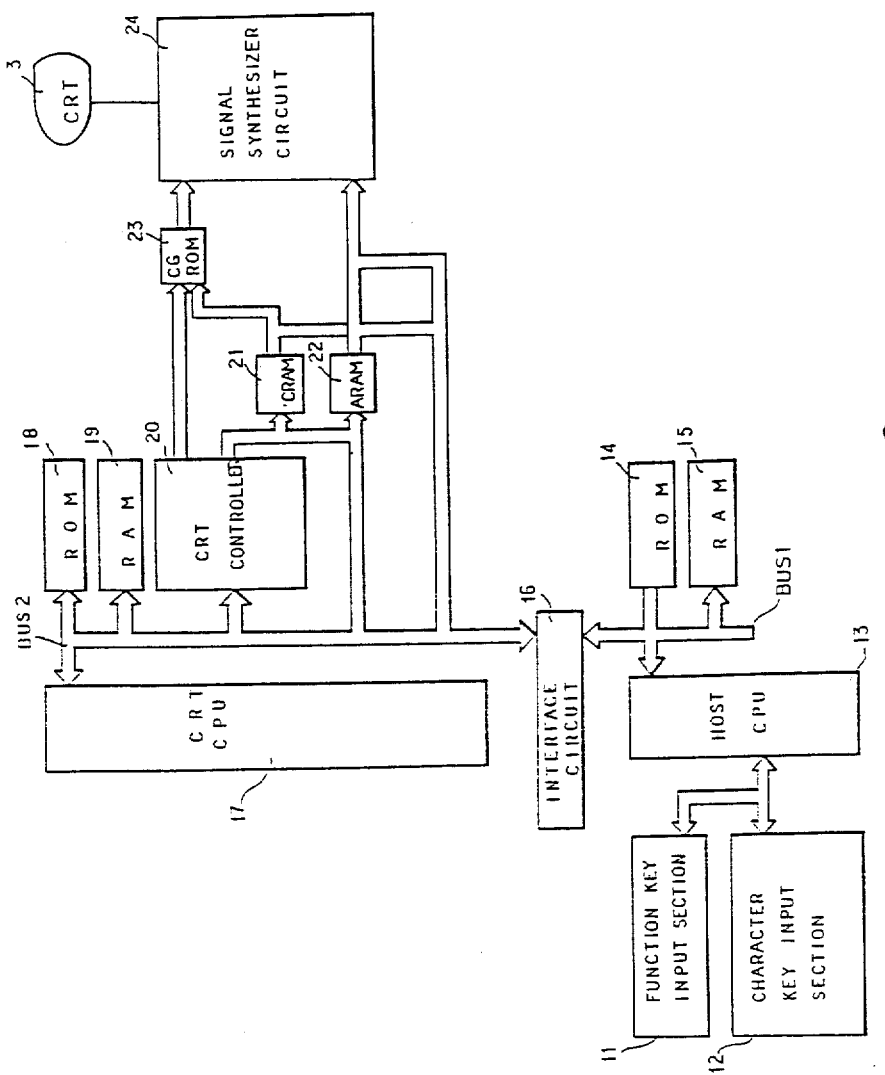
FIG. 3 is a block diagram of an electrical circuit in the word processor.

FIG. 2 shows a plan view of the keyboard 2, and FIG. 3 shows a block diagram of an electrical circuit in the word processor 1. Referring to FIGS. 2 and 3, the keyboard 2 includes various function keys 2A and various character keys 2B as suitably arranged. The function keys 2A are connected to a function key input section 11, and the character keys 2B are connected to a character key input section 12. Thus, the function key input section 11 and the character key input section 12 serve as respective interfaces between the function keys 2A and a host CPU (central processing unit) 13 and between the character keys 2B and the host CPU 13. The host CPU 13 is connected through a bus line BUS1 to a read-only memory (ROM) 14 and a random access memory (RAM) 15.

ROM 14 stores a total control program for the word processor 1, and RAM 15 stores function data and character data upon operating the keyboard 2, for example.

The host CPU 13 is connected through an interface circuit 16 to CRTCPU 17 for controlling the display 3. The CRTCPU 17 is connected through a bus line BUS2 to ROM 18 and RAM 19, and also to CRT controller 20. ROM 18 stores a control program for controlling the CRT, and RAM 19 temporarily stores various data upon controlling the CRT. The CRT controller 20 is connected at its output to a character random access memory (CRAM) 21 for storing character data and an attribute random access memory (ARAM) 22 for storing attribute data such as data of underline, bold and so on. A signal synthesizer circuit 24 is provided to synthesize the data read from CRAM 21 and ARAM 22 and the data read from a character generator read-only memory (CGROM) 23 according to an output command from the CRT controller 20, and output a display data to the display 3.

In the case of editing a text stored in the memory of the word processor 1, a file storing the text is specified by the keyboard 2 and is transferred by the host CPU 13 from a text memory in RAM 15 through the interface circuit 16 to CRTCPU 17, and is stored in a text memory in RAM 19. Then, CRTCPU 17 operates to edit the text memory in RAM 19 according to key data fed from the host CPU 13. At the same time, display data is re-written in CRAM 21 and ARAM 22 so as to display the edited text on the display 3. Further, when an edit end key 29 is depressed, CRTCPU 17 transfers the content of the text memory in RAM 19 to the host CPU 13, and the host CPU 13 then stores the content in the text memory in RAM 15.

Figure 4:
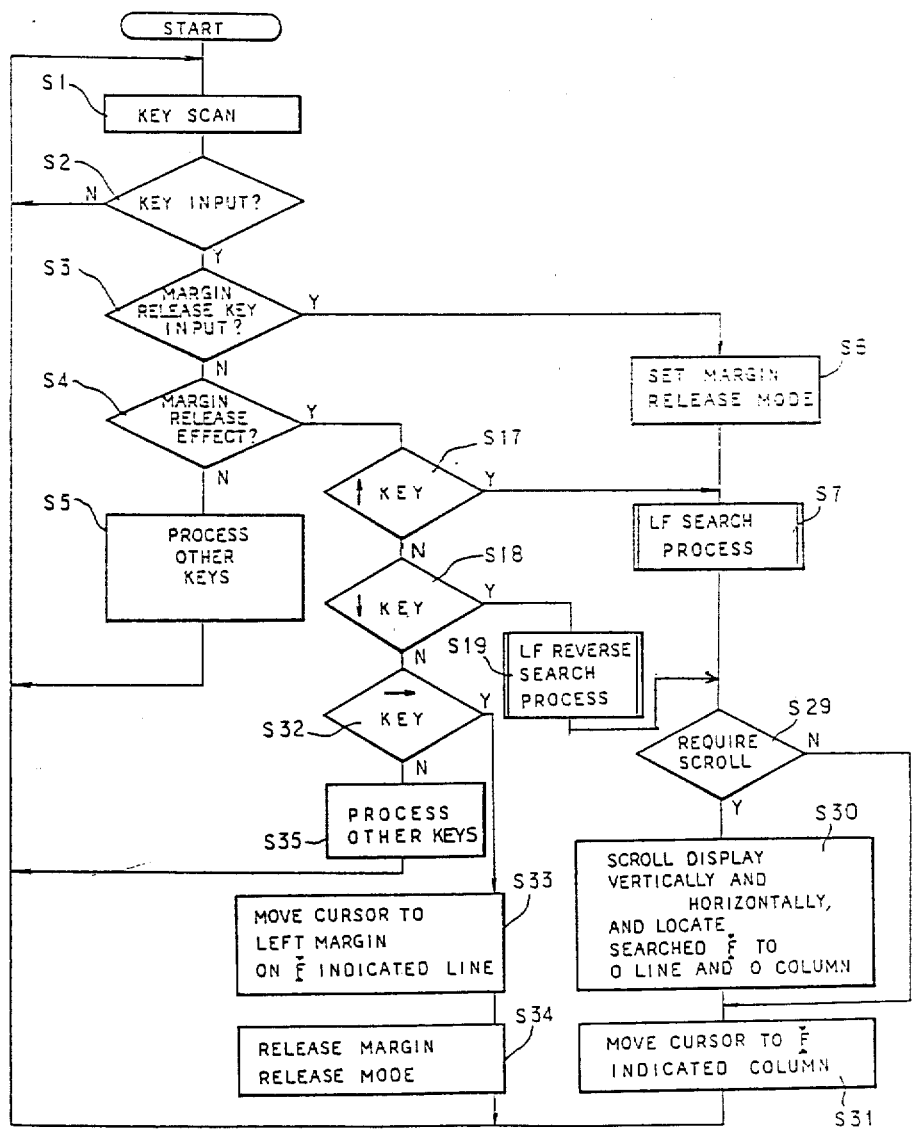
FIG. 4 is an overall flow chart of format code processing.
Figure 5:
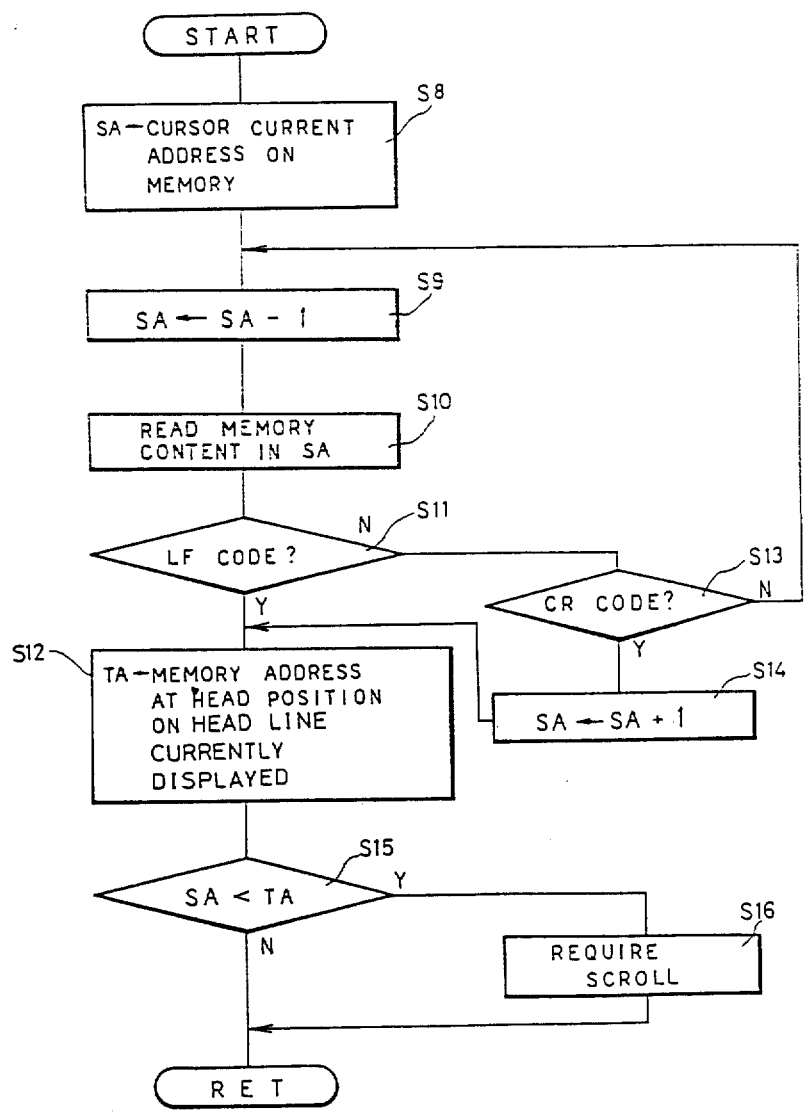
FIG. 5 is a subroutine for format code search processing.
Figure 6:
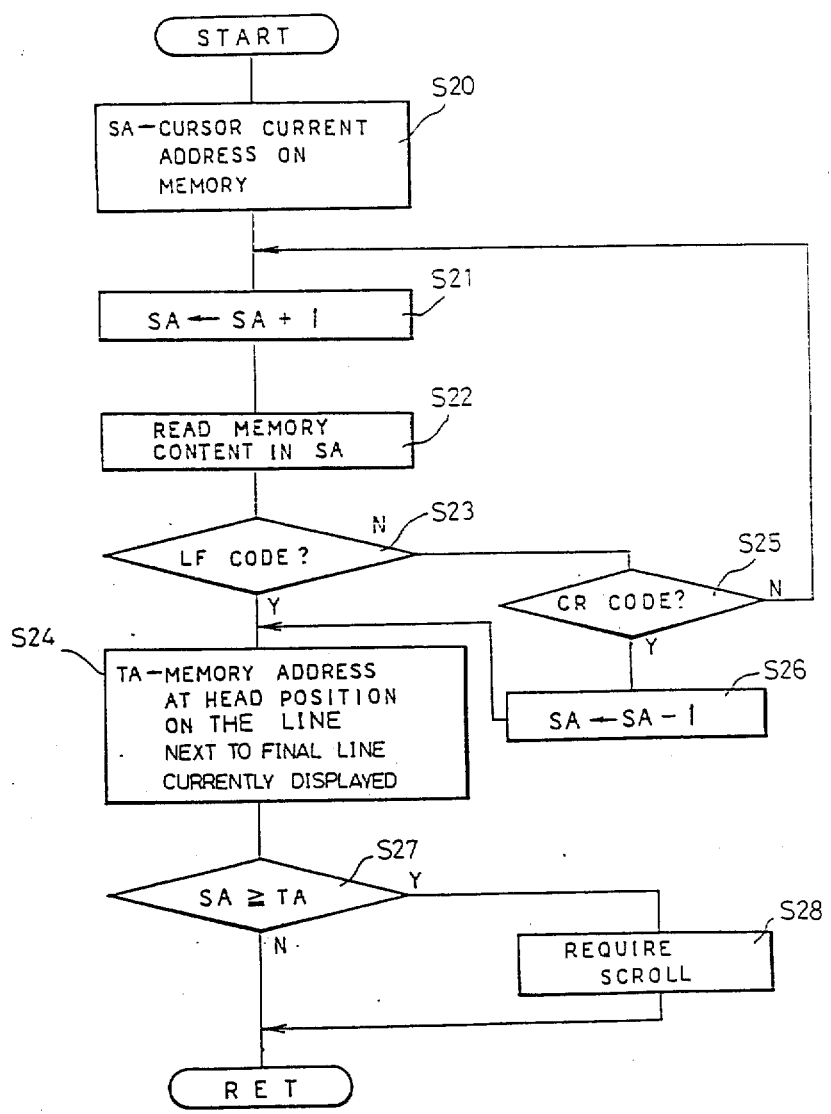
FIG. 6 is a subroutine for a line format code reverse search.

FIGS. 4 to 6 show a flow chart of format code search processing in the word processor 1 of the present invention.

Referring first to FIG. 4, format data and text data stored in RAM 19 are displayed on the display 3 at the beginning of this program. In step S1, key scanning is carried out. In step S2, it is determined whether or not key input is carried out. If NO in step S2, the key scanning continues to be executed until any key is depressed. In step S3, it is determined whether or not margin release key input is carried out. In step S4, it is determined whether or not margin release is in effect. If NO in step S4, any keys other than a margin release key 30 are processed in step S5. If YES in step S3, a margin release mode is set in step S6. Then, the program proceeds to step S7, where a subroutine for format code search processing is executed as shown in FIG. 5.

Referring o FIG. 5, the program proceeds to step S8, where a cursor current address on the text memory in RAM 19 is stored in a search address register SA in RAM 19. In step S9, 1 is subtracted from SA, and the difference is again stored into SA. Then, in step S10, a memory content addressed by SA is read. In step S11, it is determined whether or not the content is a format code LF. If YES in step S11, the program proceeds to step S12, where a memory address in RAM 19 corresponding to a head position on a head line currently displayed on the display 3 is written in a text address register TA provided in RAM 19. If NO in step S11, it is determined in step S13 whether or not the content is a carrier return code CR. If NO in step S13, the program returns to step S9 and continues to search the line format code LF. If YES in step S13, the program proceeds to step S14, where 1 is added to SA, and the sum is again stored in SA. Then, the program proceeds to step S12, where the memory address in RAM 19 corresponding to the head position on the head line currently displayed on the display 3 is written in TA. Then, in step S15, it is determined whether or not SA < TA is held. If YES in step S15, display scroll is required in step S16. If NO in step S15, the program returns to the main routine.

Referring back to FIG. 4, if the answer in step S3 is NO, and the answer in step S4 is YES, the program proceeds to step S17, where it is determined whether or not an upward moving key 31 is depressed. If YES in step S17, the program proceeds to step S7, where the LF search process is executed in the same manner as above mentioned. If NO in step S17, the program proceeds to step S18, where it is determined whether or not a downward moving key 32 is depressed. If YES in step S18, the program proceeds to step S19, where a LF reverse step is executed as shown in FIG. 6.

Referring to FIG. 6 which shows a subroutine of the LF reverse search, the program proceeds to step S20, where a cursor current address on the text memory in RAM 19 is stored in SA. Then, in step S21, 1 is added to SA, and the sum is again stored in SA. In step S22, a memory content addressed by SA is read. Then, in step S23, it is determined whether or not the memory content is a format code LF. If YES in step S23, the program proceeds to step S24, where a memory address in RAM 19 corresponding to the head position on the line next to a final line currently displayed on the display 3 is written in TA. If NO in step S23, the program proceeds to step S25, where it is determined whether or not the memory content is a carrier return code CR. If NO in step S25, the program returns to step S21, and continues to search the format code LF. If YES in step S25, the program proceeds to step S26, where 1 is subtracted from SA, and the difference is again stored in SA. Then, in step 24, the memory address in RAM 19 corresponding to the head position on the line next to the final line currently displayed on the display 3 is written in TA. Then, the program proceeds to step S27, where it is determined whether or not SA ≧ TA is held. If YES in step S27, namely, the searched format code is not indicated on the display 3 or it is indicated on the last line currently displayed, display scroll is required in step S28. If NO in step S27, the program returns to the main routine.

Referring back to FIG. 4, after executing the LF search in step S7 and the LF reverse search in step S19, the program proceeds to step S29, where it is determined whether or not display scroll is required. If YES in step S29, the program proceeds to step S30, where vertical and horizontal scroll are carried out to locate a mark F̌ of the format code LF searched in step S7 or S19 to a position of 0 line and 0 column on the display 3. The format information set by the mark F̌ is indicated at the top area of the display image on the display 3. When the format code searched in step S7 or S19 is not indicated on the display 3 or it is indicated on the last line on the display 3, the display scroll is carried out to indicate the searched format code at the left upper position of the display. Then, in step S31, a cursor K is moved to a column where the mark F̌ is indicated. Under the condition, the format code can be reset, which will be hereinafter executed in step S35. If NO in step S29, the program jumps to step S31, where the cursor K is moved to a column where the mark F̌ is indicated. Then, the program returns to step S1. In this case, as the searched format code has been already indicated within a format code area on the display, the display scroll is not carried out, and the format code may be reset.

If NO in step S18, the program proceeds to step S32, where it is determined whether or not a rightward moving key 33 is depressed. If YES in step S32, the program proceeds to step S33, where the cursor K is moved to a left margin on a line where the mark F̌ is indicated. Then, in step S34, the margin release mode is released, and the program returns to step S1. As a result, the cursor is moved to the head position in the text display area defined by the reset format code. On the other hand, if NO in step S32, the program proceeds to step S35, where the process for the key depressed in step S2 is executed.

Figure 7:
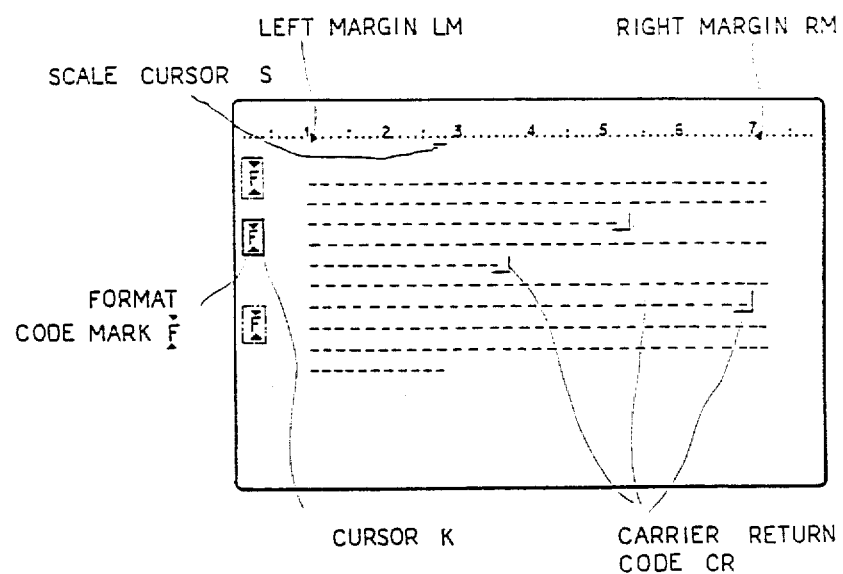
FIG. 7 is a plan view of a picture on the display.

In changing the format code during editing of the text, the cursor is moved to a position in the text area to be reformatted, and then the margin release key is depressed to search the format code in steps S6 and S7. If the searched format code is indicated in the format code display area on the display, the cursor is moved to the position where the format code is indicated. As shown in FIG. 7, the cursor is moved to a F̌ position defined by a solid line. If the searched format code is not indicated, or it is indicated at the bottom position of the display, the display is vertically scrolled to locate the searched format code to a top left position of the display and also move the cursor to this position. As shown in FIG. 7, the cursor is moved to a F̌ position shown by an alternate long and short dashes line, and is indicated at this position.

If the margin release key is depressed at an erroneous position, the upward moving key 31 or the downward moving key 32 is depressed to search the format code. Then, as similar to the above, if the searched format code is indicated in the format code display area on the display, the cursor only is moved to the position where the format code is indicated (at the F̌ position shown by an alternate long and two short dashes line in FIG. 7). If the searched format code is not indicated in the specified area, the format code and the cursor are moved to the top left position on the display (at the F̌ position shown by the alternate long and short dashes line in FIG. 7). Thus, the operator can easily find and search the desired format code, and if the margin release key is depressed at an erroneous position by the operator, the format code can be easily found.

Having thus described the preferred embodiment of the invention, it should be understood that numerous structural modifications and adaptations may be made without departing from the spirit of the invention.

What is claimed is:

1. In a word processor for processing a text composed of a plurality of text elements, each of said text elements constituted of a series of characters, each of said text elements being individually formatted according to a corresponding format data and being displayed on a text area of a screen, said word processor also displaying a predetermined formatting mark on a partial area of said screen outside of said text area, a beginning position of each of said text elements being indicated by said predetermined formatting mark; the improvement comprising:

means for storing data concerning said series of characters and said format data in association with each other;

means for placing a cursor in said text area to select one of a plurality of displayed text elements;

means connected to said placing means for retrieving said beginning position of said selected text element;

means for controlling movement of said cursor in such a manner as to move said cursor to a position where said predetermined formatting mark is displayed and corresponded to said beginning position retrieved by said retrieving means;

means connected to said retrieving means for displaying the format data corresponding to the selected text element on a display area outside said text area and said partial area; and a search key for operating said retrieving means.

2. The word processor as defined in claim 1 further comprising means for scrolling said screen until said beginning position retrieved is displayed on said screen.

3. The word processor as defined in claim 2, wherein said scrolling means scrolls said screen to display said beginning position retrieved on a first line of said screen.

4. The word processor as defined in claim 1 further comprising two keys for selecting a direction of retrieval of said beginning position, wherein one of said keys is provided to select a forward direction for retrieval from a beginning to an end of said text, while the other key is provided to select a reverse direction for retrieval from the end to the beginning of said text.

* * * * *